United States Patent Office 3,826,837
Patented July 30, 1974

3,826,837
9-AZOLYL-(1)-FLUORENE-9-CARBOXYLIC ACID DERIVATIVES AS AN ANTI-MYCOTIC AGENT
Helmut Timmler, Karl-Heinz Buchel, and Manfred Plempel, Wuppertal-Elberfeld, Germany, assignors to Farbenfabriken Bayer Aktiengesellschaft, Leverkusen, Germany
No Drawing. Original application Feb. 1, 1971, Ser. No. 111,628, now abandoned. Divided and this application June 2, 1972, Ser. No. 259,276
Claims priority, application Germany, Feb. 3, 1970, P 20 04 697.3
Int. Cl. A61k 27/00
U.S. Cl. 424—273
24 Claims

ABSTRACT OF THE DISCLOSURE

9-Azolyl-(1)-fluorene-9-carboxylic acid derivatives of the formula:

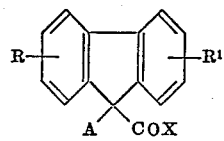

or a pharmaceutically acceptable non-toxic salt thereof, wherein R and $R^1$ are the same or different and are hydrogen, lower alkyl, lower alkoxy or halogen, A is an azolyl moiety having 2 or 3 nitro heteroatoms and X is hydroxyl, alkoxy, aminoalkoxy or a moiety of the formula:

wherein $R^2$ is hydrogen or alkyl and $R^3$ is hydrogen, alkyl or unsubstituted or substituted phenyl, are useful for their antimycotic activity in the treatment of mycoses in humans and animals. Processes for the production of said compounds are described.

This is a divisional of our copending application Ser. No. 111,628 filed Feb. 1, 1971, now abandoned.

The present invention is concerned with 9-azolyl-(1)-fluorene-9-carboxylic acid derivatives, with a process for their production, with pharmaceutical compositions useful for the treatment of mycoses in humans and animals, wherein the active ingredient comprises 1 or more of said derivatives and with methods of treating mycotic infections in humans and animals and which comprises administering 9-azolyl-(1)-fluorene-9-carboxylic acid derivatives to a human or animal in need thereof.

Fluorene-9-carboxylic acid derivatives are known to be useful in controlling the growth of higher plants (see French Patent Specifications Nos. 1,455,554 and 1,475,-530; DDR Patent Specification No. 34,214 and Austrian Patent Specification No. 241,498).

More particularly, the present invention is concerned with 9-azolyl-(1)-fluorene-9-carboxylic acid derivatives of the formula:

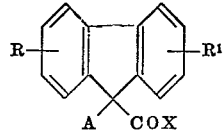

and pharmaceutically acceptable non-toxic salts thereof, wherein

R and $R^1$ are the same or different and are hydrogen, lower alkyl, lower alkoxy or halogen,
A is a 5-membered heteroaromatic moiety, i.e. an azolyl moiety, having 2 or 3 nitro heteroatoms and X is hydroxyl, alkoxy, aminoalkoxy or a moiety of the formula:

wherein
$R^2$ is hydrogen or alkyl, and
$R^3$ is hydrogen, alkyl or unsubstituted or substituted phenyl.

These compounds are particularly useful for the treatment of mycotic infections in humans and animals. The compounds of the present invention can be produced by reacting a 9-halo-fluorene-9-carboxylic acid derivative of the formula:

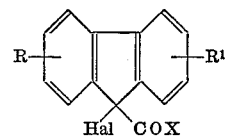

(III)

wherein
R, $R^1$ and X are as above defined, and
Hal is halogen, with an azole having 2 or 3 nitro heteroatoms, preferably in the presence of an acid binding agent. Among the preferred azoles according to the present invention are imidazole, 1,2,4-triazole, 1,2,3-triazole and pyrazole.

When, for example, 9-chloro-fluorene-9-carboxylic acid methyl ester and imidazole are used as starting materials, the course of the reaction can be illustrated by the following equation:

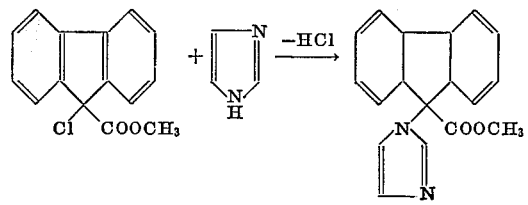

The 9-halo-fluorene-9-carboxylic acid derivatives used as starting materials can be prepared by conventional methods, for example, from 9-hydroxy-fluorene-carboxylic acids by conversion into 9-halo-fluorene-9-carboxylic acid halides by means of phosphorus halides and subsequent reaction with alcohols or amines (cf. German "Auslegeschrift" No. 1,301,173).

The reaction of the 9-halo-fluorene-9-carboxylic acid derivatives with azoles can be carried out with or without the presence of diluents. As diluents, polar organic solvents are mainly used, for example acetonitrile, nitromethane, dimethyl formamide and hexamethyl phosphoric acid triamide.

An excess of the azole can be used as acid-binding agent. Alternatively, a conventional acid-binding agent may be used. These include the alkaline earth metal and alkali metal hydroxides, alkali metal alcoholates (such as sodium methylate and sodium ethylate), alkali metal carbonates (especially potassium carbonate), and organic bases (such as triethylamine and quinoline).

The reaction temperatures may be varied within a fairly wide range. In general, the reaction is carried out at 0 to 200° C., preferably 20 to 100° C.

For every mol of 9-halo-fluorene-9-carboxylic acid compound there is used about 1 to 2 mols of the azole and, in the absence of another acid binder, about 2 to 4 mols of azole base.

The reaction products may be isolated from the reaction mixture by usual methods. The products of the process are solid crystalline compounds.

It has been found that a particularly valuable group of compounds according to the present invention are those wherein R and $R^1$ are hydrogen, lower alkyl of 1 to 3 carbon atoms, and especially 1 or 2 carbon atoms, lower alkoxy of 1 or 2 carbon atoms and wherein the halogen is fluorine, chlorine or bromine, and especially chlorine, A is imidazolyl, 1-(1,2,3-triazolyl), 1-(1,2,4-triazolyl) or 1-pyrazolyl, and especially 1-imidazolyl or 1-(1,2,4-triazolyl), X is hydroxyl, alkoxy of 1 to 4 carbon atoms, and especially 1 to 3 carbon atoms, aminoalkoxy of 1 to 4 carbon atoms, and especially 1 to 3 carbon atoms, or a moiety of the formula:

wherein $R^2$ is hydrogen or alkyl of 1 or 2 carbon atoms, and
$R^3$ is hydrogen, alkyl of 1 or 2 carbon atoms, phenyl or phenyl substituted by halogen, and especially chlorine or bromine, or alkoxy of 1 to 4 carbon atoms.

A particularly preferred group of compounds according to the present invention are those compounds of formula (I) which are represented by the formula:

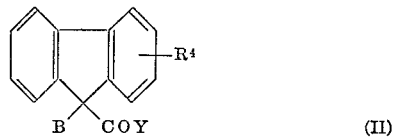

(II)

wherein $R^4$ is hydrogen or chlorine, preferably hydrogen,
B is 1-imidazolyl or 1-(1,2,4-triazolyl), and
Y is alkoxy of 1 to 4 carbon atoms.

A particularly preferred species according to the present invention is the compound of the formula:

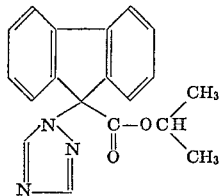

As mentioned above, the compounds of the present invention are particularly useful as a treatment of mycotic infections in humans and animals and thus can be used for treating such fungal infections which are pathogenic to both humans and animals. The compounds of the present invention also exhibit phytopathogenic activity. The compounds of the present invention can be used as such, that is, either in the form of their bases or in the form of their pharmaceutically acceptable non-toxic salts. Such salts are formed by reacting the corresponding base with the physiologically compatible non-toxic acid such as a hydrohalic acid, for example, hydrochloric acid, phosphoric acid, sulphonic acids, mono- or dicarboxylic acids and hydroxy-carboxylic acids or organic acids such as acetic acid, tartaric acid, lactic acid, malic acid, citric acid, salicylic acid and sorbic acid to produce the corresponding hydrohalide salt such as phosphorate, sulphonate, mono- or dicarboxylate, hydroxy-carboxylate, acetate, tartarate, lactate, maleate, citrate, salicylate or sorbate salt.

The compounds of the present invention may be also formulated into pharmaceutical compositions by combining a compound according to the present invention with a pharmaceutically acceptable, non-toxic, inert diluent or carrier. The present invention also includes medicament in unit dosage form which comprises 1 or more compounds of the present invention either alone or in combination with a pharmaceutically acceptable, non-toxic, inert diluent or carrier. Such medicament may include a protective envelope containing the active compound and in the case of pharmaceutical compositions, would include the pharmaceutically acceptable, non-toxic, inert diluent or carrier as well.

The term "medicament in unit dosage form" as used in the present specification means a medicament as defined above in the form of discrete portions each containing a unit dose, or a multiple or sub-multiple of a unit does of the active compound or compounds. Usually it contains 1, 2, 3, 4 or 5 unit doses, or a half, a third, a quarter or a fifth of a unit dose. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

When the compounds of the present invention are combined with pharmaceutically acceptable, non-toxic, inert diluents or carriers, the following forms are embraced by the present invention: tablets, capsules, powders, sprays, aqueous suspensions, injectable solutions, elixirs, syrups and the like. Such carriers comprise solid diluents or fillers, a sterile aqueous medium as well as various non-toxic organic solvents and the like. Tablets and the like intended for oral application may, of course, be provided with sweetening additives and similar substances. In the aforesaid case the therapeutically active compound should be present at a concentration of about 0.5 to 90 percent by weight of the total mixture, in quantities which are sufficient to achieve the range of dosage mentioned above.

In the case of oral administration, the tablets may also contain additives, such as sodium citrate, calcium carbonate and dicalcium phosphate together with various other additives, such as starch, preferably potato starch, and the like, and binding agents, such as polyvinyl-pyrrolidone, gelatin and the like. Lubricants, such as magnesium stearate, sodium lauryl sulphate and talc may also be added for the production of tablets. In the case of aqueous suspensions and/or elixirs which are intended for oral administration, the active substance may be used with various flavouring agents, coloring substances, emulsifiers and/or together with diluents, such as water, ethanol, propylene glycol, glycerol and similar compounds or combinations of this type.

In the case of parenteral administration, solutions of the active substances in sesame or peanut oil or in aqueous propylene glycol or N,N-dimethyl formamide can be used, as can sterile aqueous solutions in the case of the water-soluble compounds. Aqueous solutions of this type should be buffered in the usual way, when required, and the liquid diluent should previously be rendered isotonic by the addition of the necessary amount of salt or glucose. These aqueous solutions are particularly suitable for intravenous and intraperitoneal injections. Sterile aqueous media of this type may be prepared in known manner.

Local application normally takes place using 0.5–5%, preferably 1%, solutions (for example in dimethyl formamide, glycerol, water, alcohol (such as ethanol or isopropanol) and buffer solutions), emulsions, suspensions, powders or tablets can be used.

When the compounds of the present invention are administered to humans and animals, a therapeutically effective amount is administered until amelioration of the condition occurs. In general it has proved advantageous to administer amounts of about 30 mg. to about 200 mg., preferably about 60 to 100 mg. per kg. body weight and per day, in order to achieve satisfactory results. Nevertheless, it may sometimes be necessary to deviate from the above ranges, depending on the body weight of the treated animal or the method of application, and also on the particular animal species and its individual reaction to the medicament or on the formulation of the latter and the moment in time or the interval at which it is applied. In some cases it may be sufficient to use less than the minimum amount stated above, whereas in other cases the aforesaid upper limit will have to be exceeded. If larger amounts are applied, itt may be advisable to distribute these in several individual doses over the day.

The following non-limitative examples more particularly point out and define the present invention.

EXAMPLE 1

9-imidazolyl-(1)-fluorene-9-carboxylic acid methyl ester 20 g. 9-chloro-fluorene-19-carboxylic acid methyl ester are heated with 20 g. imidazole in 200 ml. acetonitrile under reflux for 12 hours with stirring. After distilling off the acetonitrile, the residue is treated with water and the reaction product taken up with benzene. After drying the benzene solution with sodium sulphate, the solvent is removed in a vacuum, and the residue is triturated with ligroin until it crystallizes.

In this way there are obtained 15 g. (67% of theory) of the compound of the formula:

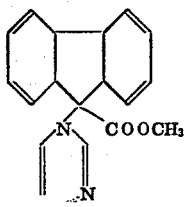

of melting point 150° C.

The 9-imidazolyl-(1)-fluorene-9-carboxylic acid ethyl ester, melting point 131° C., may be obtained by an analogous process using 9-chloro-fluorene-9-carboxylic acid ethyl ester instead of the methyl ester.

EXAMPLE 2

2-chloro-9-imidazolyl-(1)-fluorene-9-carboxylic acid methyl ester 4.6 g. sodium are dissolved in 250 ml. ethanol, and 13.4 g. imidazole are added. The ethyl alcohol is distilled off in a vacuum, and benzene is poured over the residue. After evaporating off the benzene, the residue is dissolved in 500 ml. acetonitrile and after the addition of 50.6 g. 2-chloro-9-chloro-fluorene-carboxylic acid methyl ester, the mixture is heated to boiling temperature while stirring for 24 hours. The mixture is subsequently evaporated in a vacuum, the residue is treated with water and the reaction product is taken up with ethyl acetate. After evaporation of the ethyl acetate, the residue is reprecipitated from ethyl acetate/petroleum ether. 11 g. (38% of theory) of the compound of the formula:

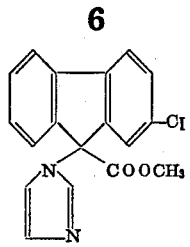

are obtained in the form of colorless crystals of melting point 205–210° C. (decomposition).

The compounds of Examples 3–13 set forth in Table 1 below are produced in analogous manner from the reactants set forth in Table 2 below. These compounds are represented by the formula (I), wherein R, $R^1$, A and X are as set forth below.

TABLE 1

| Example: | $R^1$ | R | X | A | M.P., ° C. |
|---|---|---|---|---|---|
| 3 | H | H | $OC_2H_5$ | 1-imidazolyl | 131 |
| 4 | H | H | $OC_3H_7(n)$ | do | 85 |
| 5 | H | H | $OCH_3$ | 1-(1,2,4-triazolyl) | 140–45 |
| 6 | H | H | $OC_3H_7(n)$ | 1-imidazolyl | 85 |
| 7 | H | H | $OC_3H_7(iso)$ | do | 146 |
| 8 | H | H | $OCH_3$ | do | 175 |
| 9 | H | H | $OC_2H_5$ | 1-(1,2,4-triazolyl) | 133 |
| 10 | H | H | $OC_4H_9$ | do | 158 |
| 11 | 2-Cl | H | $OCH_3$ | do | ¹ 90 |
| 12 | H | H | $O-CH(CH_3)_2$ | do | 156 |
| 13 | H | H | $OC_4H_9$ | 1-imidazolyl(hydrochloride) | ¹ 158 |

¹ Decomposed.

TABLE 2

Reactant

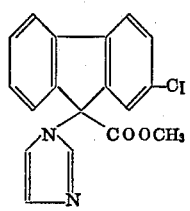

| Example: | $R^1$ | R | X | Reactant |
|---|---|---|---|---|
| 1 | H | H | $OCH_3$ | Imidazole. |
| 2 | 2-Cl | H | $OCH_3$ | Do. |
| 3 | H | H | $OC_2H_5$ | Do. |
| 4 | H | H | $OC_3H_7$ (n) | Do. |
| 5 | H | H | $OCH_3$ | 1,2,4-triazole. |
| 6 | H | H | $OC_3H_7$ (iso) | Imidazole. |
| 7 | H | H | $OCH_3$ | Do. |
| 8 | H | H | $OC_2H_5$ | 1,2,4-triazole. |
| 9 | H | H | $OC_4H_9$ | Do. |
| 10 | 2-Cl | H | $OCH_3$ | Do. |
| 11 | H | H | $O-CH(CH_3)_2$ | Do. |
| 12 | H | H | $OC_4H_9$ | Imidazole. |

The following examples illustrate solutions, ointments, suspensions and tablets which may be formulated with compounds of the present invention:

1% solution for local treatment: To 1 g. of the compound of Example 12 there is added with stirring and slight heating sufficient polyethylene glycol 400 to form 100 ml. of solution in all.

1% ointment for local treatment: 1 g. of the compound of Example 12 is triturated with 5 g. of thick liquid paraffin oil. Subsequently, sufficient ointment base of paraffin oil and polyethylene is added to form 100 g. of ointment in all.

10% suspension juice for oral application: To a mixture of 10 g. of the compound of Example 12 and 0.05 g. of saccharin sodium, 2 g. of colloidal silicic acid and 0.2 g. peppermint oil there is added sufficient vegetable oil to form 100 ml. of suspension juice in all.

Tablets for oral application containing 200 mg. of active ingredient: 2 g. of the compound of Example 12 are granulated together with 1 g. lactose and 0.3 g. of maize starch with 0.1 g. of maize starch glue. The mixture is passed through a sieve with a mesh width of about 4–6 mm. and dried. This dried mixture is homogenized through a sieve with a mesh width of 0.8–1 mm., and then mixed with 0.15 g. of starch and 0.02 g. magnesium stearate. The mixture so obtained is pressed into 10 tablets.

Table 3 below sets forth the minimum inhibitory concentration of representative compounds according to the present invention *in vitro* against representative dermatocytes and yeast. The values were:

TABLE 3

Minimum inhibitory concentration in γ/ml. nutrient medium

| Compound of Example— | Trichophyton species | Microsporon species | *Candida albicans* |
|---|---|---|---|
| 2 | 100 | 100 | 100 |
| 1 | <4 | <4 | 40 |
| 3 | <4 | <4 | 40 |
| 4 | <4 | <4 | <4 |
| 7 | <4 | <4 | <4 |
| 12 | 20 | 10 | <4 |
| 8 | <4 | <4 | 100 |
| 9 | 4 | <4 | 10 |
| 10 | <4 | <4 | <4 |

The preparations are of the fungistatic type of activity; when 30% of bovine serum are added, they exhibit only a low degree of protein-binding and inactivation which increases the minimum inhibitory concentration values by not more than 2 stages of dilution.

The compounds also show good effects in the *in vivo* test on white mice infected with *Candida* and in the case of experimental trichophytia in guinea pigs caused by *Trichophyton mentaphytes* and *Trichophyton quinckeanum*.

(a) Experimental *Candida* infection in white mice: After oral administration of 20 mg./kg. twice daily to 100 mg./kg. twice daily of the compound of Example 12, 18 of 20 white mice which had been previously infected with *Candida albicans* survived on the 6th day after infection, whereas 90% of the untreated control animals had died by the 6th day after infection. The compound of Example 12 is representative of the activity exhibited by the compounds of the present invention.

(b) Experimental trichophytia in guinea pigs: Guinea pigs infected with *Trichophyton metagrophytes* and *Trichophyton quinckeanum* were treated locally once daily with a 1% solution of the compound of Example 12 in polyethylene glycol 400. On the 16th day after infection, the infected areas of the control animals exhibited deep bleeding ulcerations, whereas the treated animals only exhibited hair-less infected areas which were not inflamed. The same curative effect was observed when treatment was carried out with the compounds of Examples 1, 2, 4 and 7.

The DL$_{50}$ for mice and rats is about 450 to 900 mg./kg. in the case of oral administration.

As illustrated above, the compounds of the present invention show surprisingly good antimycotic activity. These compounds are thus indicated to be useful for the treatment of the following types of diseases:

(a) In human medicine:

(1) dermatomycoses caused by fungi of the species Trichophyton, Microsporium, Epidermophyton, Aspergillus, *Candida albicans* and other yeasts;

(2) organomycoses caused by yeasts, mould fungi and dermatophytes, as well as coccidioides, histoplasma and other biphasic fungi.

(b) In veterinary medicine: dermatomycoses and organomycoses caused by yeasts, mould fungi and dermatophytes.

What is claimed is:

1. A pharmaceutical composition for the treatment of mycotic infections which comprises an antimycotic amount of a 9-azolyl-(1)-fluorene - 9 - carboxylic acid derivative combined with a pharmaceutically acceptable non-toxic inert diluent or carrier, said derivative having the formula:

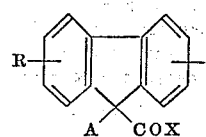

or a pharmaceutically acceptable non-toxic salt thereof, wherein

R and R$^1$ are the same or different and are hydrogen, lower alkyl, lower alkoxy or halogen, A is imidazolyl and X is hydroxyl, lower alkoxy, amino lower alkoxy, a moiety of the formula:

wherein

R$^2$ is hydrogen or lower alkyl, and

R$^3$ is hydrogen, lower alkyl or unsubstituted or substituted phenyl.

2. A pharmaceutical composition according to claim 1 wherein

R and R$^1$ are hydrogen, alkyl of 1 to 3 carbon atoms, lower alkoxy of 1 or 2 carbon atoms, fluorine, chlorine or bromine, X is hydroxyl, alkoxy of 1 to 4 carbon atoms, aminoalkoxy of 1 to 4 carbon atoms or a moiety of the formula:

wherein

R$^2$ is hydrogen or alkyl of 1 or 2 carbon atoms, and

R$^3$ is hydrogen, alkyl of 1 or 2 carbon atoms, phenyl or phenyl substituted by halogen or alkoxy of 1 to 4 carbon atoms.

3. A pharmaceutical composition according to claim 1 wherein

R and R$^1$ are hydrogen, alkyl of 1 or 2 carbon atoms, alkoxy of 1 or 2 carbon atoms or chlorine, A is 1-imidazolyl and X is hydroxyl, alkoxy of 1 to 4 carbon atoms, aminoalkoxy of 1 to 3 carbon atoms or a moiety of the formula:

wherein

R$^2$ is hydrogen or alkyl of 1 or 2 carbon atoms and

R$^3$ is hydrogen, alkyl of 1 or 2 carbon atoms, phenyl or phenyl substituted by chlorine, bromine or alkoxy of 1 to 4 carbon atoms.

4. A pharmaceutical composition wherein the derivative of claim 1 has the formula:

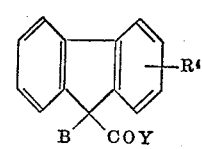

or a pharmaceutically acceptable non-toxic salt thereof, wherein
R⁴ is hydrogen or chlorine,
B is 1-imidazolyl and
Y is alkoxy of 1 to 4 carbon atoms.

5. A pharmaceutical composition according to claim 4, wherein R⁴ is hydrogen.

6. A pharmaceutical composition according to claim 1, wherein the salt is a hydrohalide, a phosphoride, a sulphonate, a mono- or dicarboxylate, an hydroxycarboxylate, an acetate, a tartrate, a lactate, a maleate, a citrate, a salicylate or a sorbate.

7. A pharmaceutical composition according to claim 1 wherein the derivative is

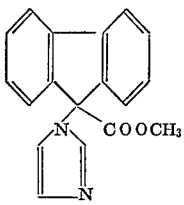

8. A pharmaceutical composition according to claim 1 wherein the derivative is 9-imidazolyl - (1) - fluorene-9-carboxylic acid ethyl ester.

9. A pharmaceutical composition according to claim 1 wherein the derivative is

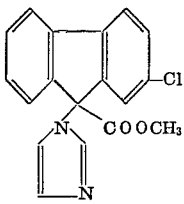

10. A pharmaceutical composition according to claim 1, wherein R and R¹ are hydrogen, A is 1-imidazolyl and X is n-propoxy.

11. A pharmaceutical composition according to claim 1, wherein R and R¹ are hydrogen, A is 1-imidazolyl and X is iso-propoxy.

12. A pharmaceutical composition according to claim 1, wherein R and R¹ are hydrogen, A is 1-imidazolyl and X is butoxy.

13. A method of treating mycotic infections which comprises administering to a human or animal in need thereof an anti-mycotic amount of a composition of claim 1.

14. A method of treating mycotic infections which comprises administering to a human or animal in need thereof an anti-mycotic amount of a composition of claim 2.

15. A method of treating mycotic infections which comprises administering to a human or animal in need thereof an anti-mycotic amount of a composition of claim 3.

16. A method of treating mycotic infections which comprises administering to a human or animal in need thereof an anti-mycotic amount of a composition of claim 4.

17. A method of treating mycotic infections which comprises administering to a human or animal in need thereof an anti-mycotic amount of a composition of claim 5.

18. A method of treating mycotic infections which comprises administering to a human or animal in need thereof an anti-mycotic amount of a composition of claim 6.

19. A method of treating mycotic infections which comprises administering to a human or animal in need thereof an anti-mycotic amount of a composition of claim 7.

20. A method of treating mycotic infections which comprises administering to a human or animal in need thereof an anti-mycotic amount of a composition of claim 8.

21. A method of treating mycotic infections which comprises administering to a human or animal in need thereof an anti-mycotic amount of a composition of claim 9.

22. A method of treating mycotic infections which comprises administering to a human or animal in need thereof an anti-mycotic amount of a composition of claim 10.

23. A method of treating mycotic infections which comprises administering to a human or animal in need thereof an anti-mycotic amount of a composition of claim 11.

24. A method of treating mycotic infections which comprises administering to a human or animal in need thereof an anti-mycotic amount of a composition of claim 12.

References Cited

UNITED STATES PATENTS 3,530,183   9/1970   Kyburz et al. _____ 260—309.6

OTHER REFERENCES

Davis et al.: Chemical Abstracts 61: 5586–7 (1964).
Draper et al.: Chemical Abstracts 73: 45510g (1970).
Fournavi et al.: Chemical Abstracts 69: 106622u (1968).
McGown et al.: J. Am. Chem. Soc. Vol. 64, pp. 689–90 (1942).

JEROME D. GOLDBERG, Primary Examiner